United States Patent
Hirakawa et al.

(10) Patent No.: US 9,466,824 B2
(45) Date of Patent: Oct. 11, 2016

(54) SEALED BATTERY

(71) Applicants: TOYOTA JIDOSHA KABUSHIKI KAISHA, Toyota-shi, Aichi (JP); KOKOKU INTECH CO., LTD., Tokyo (JP)

(72) Inventors: Yasushi Hirakawa, Moriguchi (JP); Shinya Muroi, Kawagoe (JP)

(73) Assignees: TOYOTA JIDOSHA KABUSHIKI KAISHA, Toyota (JP); KOKOKU INTECH CO., LTD., Tokyo (JP)

( * ) Notice: Subject to any disclaimer, the term of this patent is extended or adjusted under 35 U.S.C. 154(b) by 26 days.

(21) Appl. No.: 14/403,002

(22) PCT Filed: May 23, 2013

(86) PCT No.: PCT/JP2013/064313
§ 371 (c)(1),
(2) Date: Nov. 21, 2014

(87) PCT Pub. No.: WO2014/017156
PCT Pub. Date: Jan. 30, 2014

(65) Prior Publication Data
US 2015/0140368 A1 May 21, 2015

(30) Foreign Application Priority Data
Jul. 27, 2012 (JP) ................. 2012-167224

(51) Int. Cl.
*H01M 2/08* (2006.01)
*H01M 2/36* (2006.01)
*H01M 2/12* (2006.01)

(52) U.S. Cl.
CPC ........... *H01M 2/365* (2013.01); *H01M 2/1223* (2013.01)

(58) Field of Classification Search
CPC ..................................................... H01M 2/08
See application file for complete search history.

(56) References Cited

U.S. PATENT DOCUMENTS

| 6,455,193 B1 | 9/2002 | Miyazaki et al. | |
| 2002/0187393 A1* | 12/2002 | Ananthanarayanan | H01M 2/06 429/178 |
| 2008/0166625 A1 | 7/2008 | Schembri et al. | |
| 2011/0072648 A1* | 3/2011 | Yamauchi | H01M 2/36 29/623.2 |

FOREIGN PATENT DOCUMENTS

| JP | 2003-338270 A | 11/2003 |
| JP | A-2007-18915 | 1/2007 |

(Continued)

*Primary Examiner* — Stewart Fraser
*Assistant Examiner* — Olatunji Godo
(74) *Attorney, Agent, or Firm* — Oliff PLC

(57) ABSTRACT

A sealed battery includes an electrode body; a battery case housing the electrode body and having an open surface; a lid member closing the case; a liquid inlet formed penetrating through the lid member; and a sealing member. The sealing member has: a metal sealing plate welded to the lid member to cover and seal the liquid inlet; and an annular movable portion displaceable between a contact position contacting the entire circumference of the inlet and a non-contact position not contacting at least a portion of the inlet. The movable portion is displaced to the non-contact position when the pressure of the inside region of the battery case sealed by the movable portion in the contact position is increased beyond a limit value with respect to the pressure of the outside region opposite from the inside region with respect to the movable portion.

7 Claims, 11 Drawing Sheets

(56) References Cited

FOREIGN PATENT DOCUMENTS

| JP | B2-4111621 | 7/2008 |
| JP | A-2009-87659 | 4/2009 |
| JP | A-2012-169111 | 9/2012 |
| JP | A-2013-161596 | 8/2013 |
| KR | 2000-0076884 A | 12/2000 |
| KR | 10-2007-0121732 A | 12/2007 |

\* cited by examiner

SEALED BATTERY

CROSS-REFERENCE TO RELATED APPLICATIONS

This is a U.S. national phase application based on the PCT International Patent Application No. PCT/JP2013/064313 filed on May 23, 2013, and claiming the priority of Japanese Patent Application No. 2012-167224, filed on Jul. 27, 2012, the entire contents of which are herewith incorporated by reference.

TECHNICAL FIELD

The present invention relates to a sealed battery in which an electrode body and an electrolyte are enclosed in a battery case and more particularly to a sealed battery hermetically sealed in a manner that an electrolyte is poured in a battery case and then a liquid inlet is sealed.

BACKGROUND ART

Conventionally, there is a sealed battery hermetically sealed in a manner that an electrolyte is poured in a battery case enclosing an electrode body and then a liquid inlet is sealed. One example of secondary batteries using a flat rectangular metal battery case is formed with a liquid inlet in a lid member that closes an opening of the battery case. When such a battery is to be manufactured, a lid member with a liquid inlet opened is fixed to a battery case before an electrolyte is poured therein, and then the electrolyte is injected in the battery case through the liquid inlet. After liquid pouring, a metal sealing plate is placed to cover the liquid inlet, and the circumference of the sealing plate is welded to the lid member without gap. Thus, a sealed battery is produced.

Patent document 1 discloses a sealed battery configured such that a liquid inlet is sealed with a sealing plug formed of a metal plate combined with a resin protruding portion, not a simple plate-like sealing plate. According to Patent Document 1, a burr protrusion is formed in the liquid inlet, so that the protruding portion is temporarily fixed in the liquid inlet by insertion therein. Accordingly, the sealing plug is less likely to be displaced in the course of welding the metal plate to a battery housing, thereby enabling reliably preventing sealing defects. Patent Document 1 teaches, as one example of the material of the protruding portion, rubber material having appropriate elasticity and others.

RELATED ART DOCUMENTS

Patent Documents

Patent Document 1: JP-A-2009-87659

SUMMARY OF INVENTION

Problems to be Solved by the Invention

In a weld, on rare occasion, welding defects or failures such as pinholes and cracks may be caused. To avoid commercial distribution of products with such welding defects, a welding state is examined by an inspection for hermetically sealing property after welding. However, when welding is made while the sealing plug is temporarily fixed as disclosed in Patent Document 1, the sealing is provided by not only the weld zone but also rubber material. Specifically, if at least one of the sealed portion by the rubber material and the sealed portion by welding has a sealing property or strength during the inspection for hermetically sealing property, the hermetically sealing property is determined to be good. Accordingly, while the sealing property is maintained with the rubber material, it is impossible to reliably determine whether or not the welding state is good by only a simple inspection for hermetically sealing property.

On the other hand, the rubber material is less resistant to contact with water and electrolyte. It is therefore difficult to prevent the water from entering in the battery from outside or the electrolyte from penetrating from inside of the battery by only the rubber material for a long term. If a defective welding state is missed, the hermetically sealing property of a battery may deteriorate when the sealing property of the rubber material is lost due to deterioration of the rubber material. In other words, regarding a battery having a sealed portion with the rubber material, the quality of the welding state could not be reliably determined and the long-term hermetically sealing property could not be ensured.

The present invention has been made to solve the above problems and has a purpose to provide a sealed battery enabling reliable determination about the quality of a welding state around a liquid inlet in an inspection.

Means of Solving the Problems

To achieve the above purpose, one aspect of the invention provides a sealed battery including: an electrode body; a battery case housing the electrode body and having an open surface; a lid member closing the open surface of the battery case; a liquid inlet formed penetrating through the lid member; and a sealing member configured to seal the liquid inlet, wherein the sealing member includes: a metal sealing plate welded to the lid member around the liquid inlet of to cover an outer open end of the liquid inlet to seal the liquid inlet; and an annular movable portion placed in contact with a surface of the sealing plate on an inside of the battery case and provided freely displaceable between a contact position where the movable portion contacts with an entire circumference of the liquid inlet and a non-contact position where the movable portion does not contact with at least part of the liquid inlet, the movable portion being configured to seal the liquid inlet when the movable portion is in the contact position, the movable portion is configured to be displaced to the non-contact position when pressure in an inside region on inside of the battery case sealed by the movable portion in the contact position is increased beyond a limit value with respect to pressure in an outside region on an opposite side to the inside region with respect to the movable portion.

According to the aforementioned sealed battery, the movable portion of the sealing member is freely flexible, or displaceable, between the contact position and the non-contact position by a difference in pressure between the regions located on both sides of the movable portion. In the following explanation, a region in the battery more inside than the movable portion is referred to as an "inside region" and a region on an opposite side to the inside region with respect to the movable portion is referred to as an "outside region". In a battery just assembled, the movable portion is located in the contact position. Thus, the inside region and the outside region are isolated by the movable portion and the inside region is thereby sealed. That is, the inside of the battery case is sealed with respect to the weld zone and thus welding is less likely to affect the inside of the battery case.

After hermetically sealing by welding, the battery is initially charged. Since gas is generated from the electrode body during the initial charge, the inner pressure of the battery case increases than that before start of the initial charge. Specifically, the pressure in the inside region rises. When this pressure of the inside region increases beyond a limit value with respect to the pressure in the outside region, the movable portion comes to the non-contact position, and thus the sealed state by the movable portion is lost. This causes gas generated by the initial charge to flow in the outside region.

Sealing between the outside region and the outside of the battery case is made by the sealing plate and the weld zone between the sealing plate and the liquid inlet. When the welding state is good, the liquid inlet is reliably sealed and the gas does not leak from the outside region to the outside of the battery case. However, if a welding defect exists, the sealing between the outside region and the outside of the battery case is not sufficient, causing gas to leak from the outside region to the outside of the battery case.

Specifically, when gas leakage is detected outside the battery case by increasing the pressure in the inside region beyond the limit value with respect to the pressure in the outside region, it is possible to detect whether the welding state is good or not.

For instance, reducing the pressure of the outside of the battery after initial charge enables an inspection about whether the welding state is good or not. If a poor or defective weld zone exists, the pressure in the outside region is also reduced as the outside pressure of the battery is reduced. That is, the pressure in the inside region can be increased beyond the limit value with respect to the pressure in the outside region. Specifically, when the outside pressure of the battery is reduced after the initial charge, if the defective weld zone exists, the movable portion is displaced to the non-contact position, resulting in loss of the sealing property. This leads to gas leakage to the outside of the battery through the defective weld portion. Thus, the sealed battery can be provided enabling reliable determination about whether the welding state around the liquid inlet is good or not by avoiding the influence of the sealing property of the movable portion.

Furthermore, it is preferable that the movable portion has a returning function of returning from the non-contact position to the contact position when the pressure difference between the inside region and the outside region returns to the limit value or less after the movable portion is displaced to the non-contact position. When the movable portion returns to the contact position, it can seal again between the inside region and the outside region, thereby preventing entrance of foreign matters from the outside or leakage of the electrolyte in a step other than an inspection step for hermetically sealing property.

Furthermore, preferably, the movable portion is an elastic body. Since the movable portion is an elastic body, it can have the returning function.

Preferably, the movable portion is made of rubber material. Since the movable portion is made of rubber material, it is easy to adjust the hardness according to selection of a mixture ratio of carbon, for example. Accordingly, an appropriate limit value can be set.

More preferably, the movable portion has a cross sectional shape in a penetrating direction of the liquid inlet to have a thickness T and a length L determined to meet a relationship of T<L. With this shape, the limit value is less changed even when an attachment shape somewhat varies. This can facilitate adjusting of the limit value.

Preferably, the sealing member includes an insertion portion located inside the movable portion of an annular shape and inserted in the liquid inlet in contact with a surface of the sealing plate on the inside of the battery case. This insertion portion can facilitate positioning between the sealing member and the liquid inlet.

It is further preferable that the liquid inlet includes: a bottom-closed outer hole including an outer open end; and an inner hole including an inner open end and being coaxial with the outer hole, the inner hole having a smaller diameter than the outer open end, the inner hole is formed penetrating through the lid member to communicate with the outer hole through a bottom surface of the outer hole, and the movable portion is configured to protrude obliquely from a surface of the sealing plate on the inside of the battery case outward in a radial direction of the liquid inlet and placed in pressure contact with the bottom surface of the outer hole to seal the liquid inlet. This configuration facilitates assembly. For instance, when liquid is poured under reduced pressure, the sealing member has only to be supplied from outside, so that the movable portion can ensure hermetical sealing.

Effects of the Invention

According to the sealed battery of the invention, it is possible to reliably determine whether a welding state surrounding a liquid inlet in an inspection is good or not.

MODE FOR CARRYING OUT THE INVENTION

A detailed description of a preferred embodiment of the present invention will now be given referring to the accompanying drawings. In this embodiment, the present invention is applied to a sealed lithium ion secondary battery in which an electrode body and an electrolyte are enclosed in a rectangular metal case.

[Structure of Battery]

Figure 1:
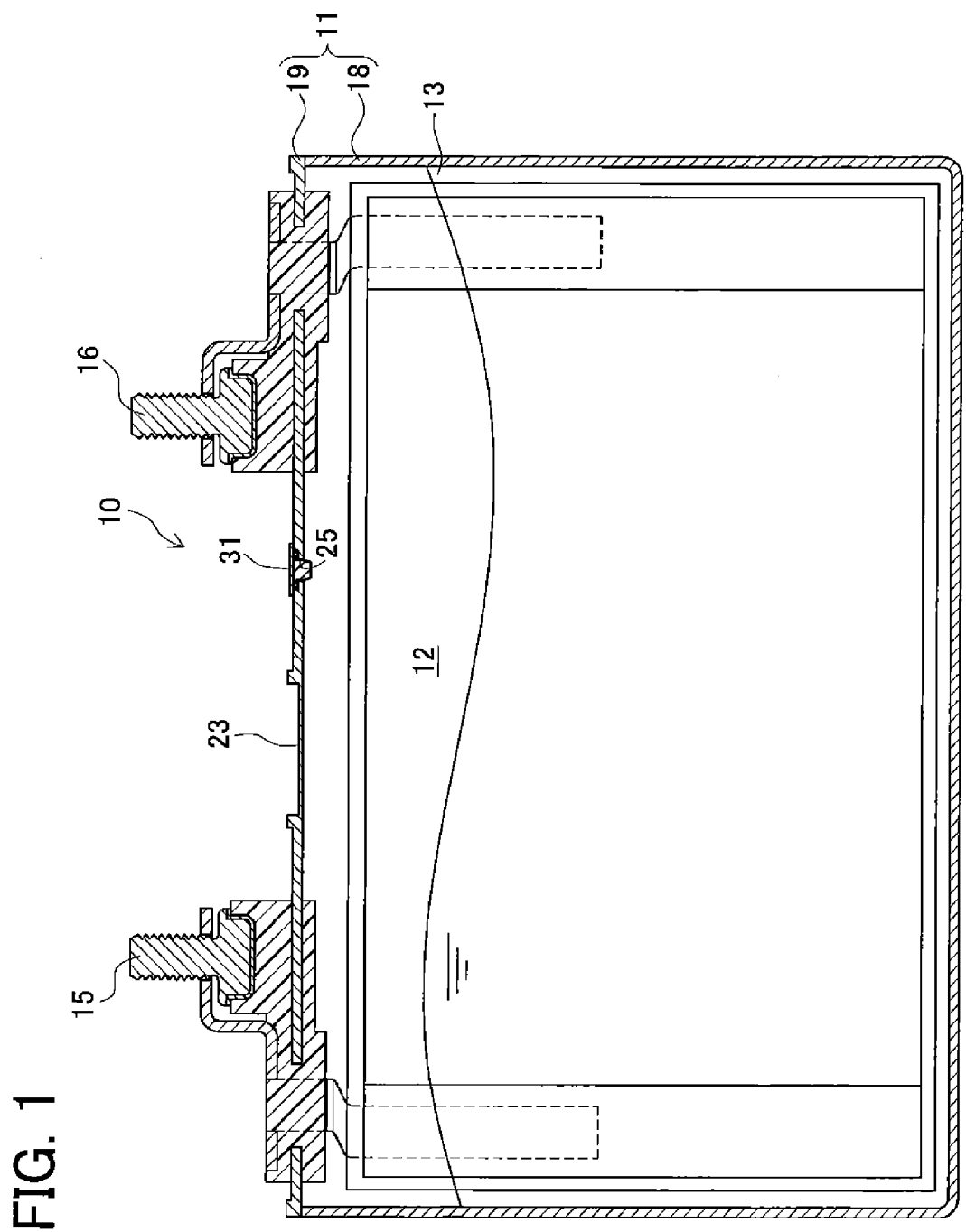
FIG. 1 is a cross sectional view of a schematic configuration of a secondary battery in an embodiment.

A secondary battery 10 of the present embodiment is a sealed battery in which an electrode body 12 and an electrolyte 13 are enclosed in a battery housing 11 as shown in a cross sectional view of FIG. 1. The battery housing 11 is made of metal formed in a flat rectangular box-like shape.

The electrode body 12 of the present embodiment is a wound body formed of a strip-shaped positive electrode sheet and a strip-shaped negative electrode sheet, and strip-shaped separators interposed therebetween, which are wound together. The positive electrode sheet of the present embodiment consists of an aluminum foil and positive active material layers formed on both surfaces of the aluminum foil. The positive active material layer contains a positive mixture material made of positive active material that can absorb and release lithium ions. A preferable one of the positive mixture material is for example prepared by kneading a binder, a dispersed solvent, and others into lithium containing metal oxide. The negative electrode sheet of the present embodiment consists of a copper foil and negative active material layers formed on both surfaces of the copper foil. The negative active material layer contains carbon material and others.

The secondary battery 10 includes a positive terminal 15 and a negative terminal 16 each provided to protrude out of the battery housing 11. The positive terminal 15 is connected to the positive electrode sheet of the electrode body 12 inside the battery housing 11. The negative terminal 16 is connected to the negative electrode sheet of the electrode body 12 inside the battery housing 11. As the electrolyte 13, nonaqueous electrolyte containing lithium salt, ion conductive polymer, or others are suitably available.

The battery housing 11 includes, as shown in FIG. 1, a battery case 18 of a nearly rectangular parallelepiped shape having one open surface and a lid member 19 that closes the open surface. The battery case 18 and the lid member 19 are fixed to each other by welding over the entire circumference of the lid member 19 without gap.

Figure 2:
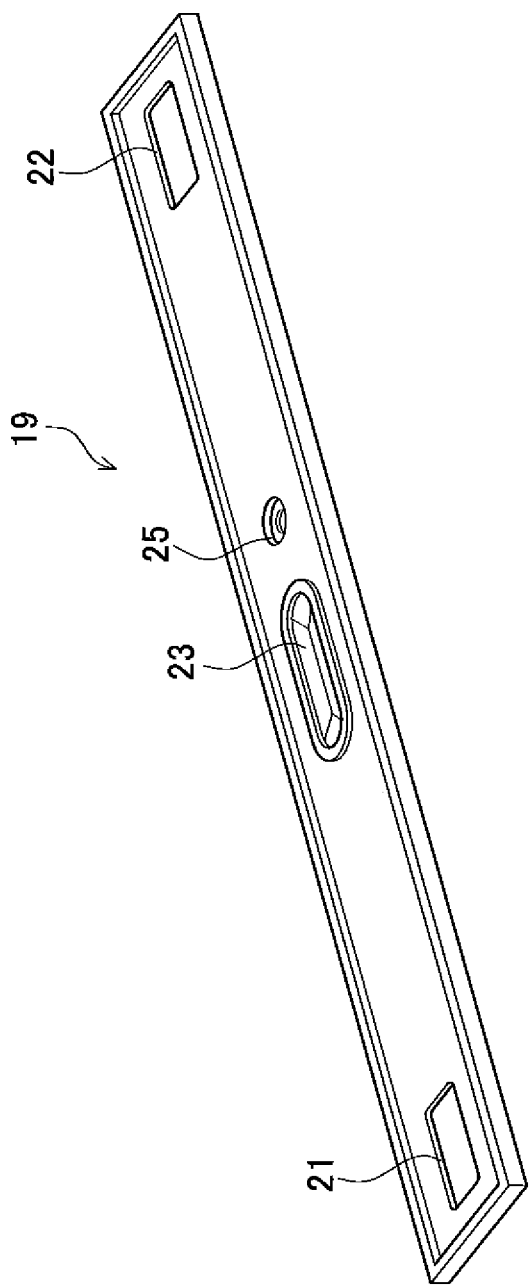
FIG. 2 is a perspective view of a lid member.

The lid member 19 before attached to the battery case 18 is a narrow plate-shaped member formed with a plurality of holes as shown in FIG. 2. The lid member 19 is for example an aluminum plate having a thickness of about 1 mm. This lid member 19 is formed, at both end portions thereof in a longitudinal direction, with through holes 21 and 22. The through hole 21 allows the positive terminal 15 (see FIG. 1) to extend therethrough. The through hole 22 allows the negative terminal 16 (see FIG. 1) to extend therethrough.

Near the center of the lid member 19, an oval safety valve 23 is provided. This safety valve 23 is a portion formed with a thinner thickness than remaining portions without penetrating through the lid member 19. When the inner pressure of the battery housing 11 exceeds a valve opening pressure of the safety valve 23, the safety valve 23 is broken or fractured, thus opened, thereby releasing out the gas having caused an increase in the inner pressure. Adjacent to the safety valve 23, a liquid inlet 25 is formed penetrating through the lid member 19. The liquid inlet 25 is a hole through which an electrolyte 13 is poured into the assembled battery housing 11.

Figure 3:
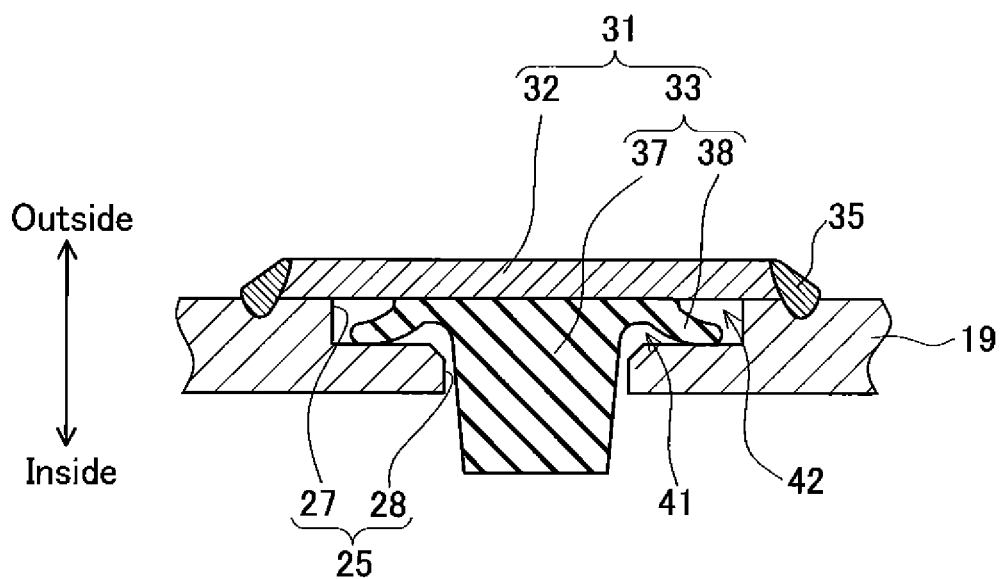
FIG. 3 is a cross sectional view showing a liquid inlet sealed with a sealing member.

In the secondary battery 10 of the present embodiment, as shown in FIG. 1, the sealing member 31 is attached to the liquid inlet 25. FIG. 3 shows an enlarged cross sectional view of the liquid inlet 25 and its surrounding area. In the following explanation, as shown in FIG. 3, the side corresponding to the outside of the battery housing 11 with respect to the lid member 19 is referred to as outside and the side corresponding to the inside of the battery housing 11 is referred to as inside. The sealing member 31 is attached to the liquid inlet 25 by insertion therein from outside to inside.

The liquid inlet 25 has an outer hole 27 and an inner hole 28 communicating with each other and penetrating through the lid member 19. That is, the liquid inlet 25 is a stepped through hole. The sealing member 31 includes a metal sealing plate 32 and a rubber sealing part 33 that are fixed to each other as a single piece. A peripheral edge of the sealing plate 32 is laid on and welded to an outer surface of the lid member 19 around the liquid inlet 25. Thus, a weld zone 35 is formed over the entire circumference of the sealing plate 32.

The sealing part 33 of the sealing member 31 includes an insertion portion 37 placed extending through the inner hole 28 and a movable portion 38 placed in the outer hole 27 without extending through the inner hole 28 as shown in FIG. 3. The movable portion 38 is in contact with the lid member 19 over the entire circumference of the liquid inlet 25 to seal the liquid inlet 25. Furthermore, while the movable portion 38 is placed in contact with the lid member 19 in the liquid inlet 25, the internal region of the outer hole 27 is divided into an inside region 41 and an outside region 42 located on both sides of the movable portion 38.

The weld zone 35 is formed by welding using for example a YAG laser, a fiber laser, an electronic beam, and others. The weld zone 35 is made by continuous spot welding or seamless welding to surround the entire circumference of the sealing plate 32 without gap. From the point of view of easiness of welding, the sealing plate 32 is preferably made of the same material as the lid member 19. The battery housing 11 is hermetically sealed by this weld zone 35 and welding of the welded battery case 18 and the lid member 19.

Figure 4:
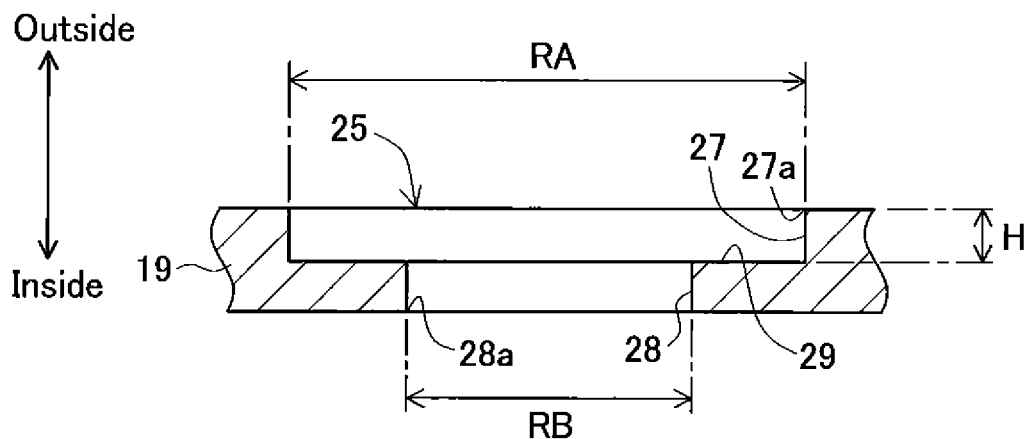
FIG. 4 is a cross sectional view of the liquid inlet.

FIG. 4 is a cross sectional view of the liquid inlet 25. The outer hole 27 is a bottom-closed hole having an outer open end 27a open in the outer surface of the lid member 19. A bottom 29 of the outer hole 27 is an annular surface parallel to the plate surface of the lid member 19. The inner hole 28 is coaxial with the outer hole 27 and has an inner open end 28a open in the inner surface of the lid member 19. The diameter RA of the outer open end 27a is larger than the diameter RB of the inner open end 28a. The depth H from the outer open end 27a to the bottom 29 of the outer hole 27 is for example about half of the thickness of the lid member 19. At a boundary between the bottom 29 and the inner hole 28, a chamfer may be formed as shown in FIG. 3 or an angular corner may be formed as shown in FIG. 4.

Figure 5:
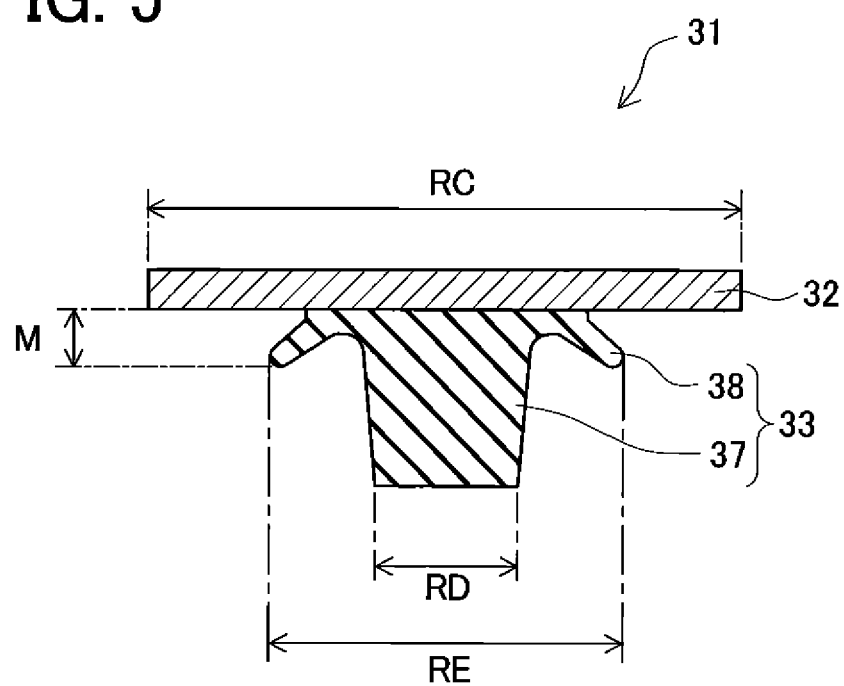
FIG. 5 is a cross sectional view of a sealing member before it is attached to the liquid inlet.

FIG. 5 shows the sealing member 31 before attached to the liquid inlet 25. The sealing plate 32 is a metal plate having a size enough to cover the outer open end 27a (see FIG. 4) of the liquid inlet 25. The sealing plate 32 is of a circular plate-like shape for example. In the sealing member 31 of the present embodiment, the diameter RD of the sealing plate 32 is larger than the diameter RA of the outer open end 27a.

The sealing part 33 of the sealing member 31 includes the insertion portion 37 of a nearly columnar shape and the movable portion 38 of an annular shape surrounding the insertion portion 37 as shown in FIG. 5. When the insertion portion 37 is inserted in the inner hole 28, the sealing member 31 is positioned in place. Therefore, the diameter RD of a distal end of the insertion portion 37 is smaller than the diameter RB of the inner open end 28a (see FIGS. 3 and 4). This makes it easy to insert the insertion portion 37 in the inner hole 28. The insertion portion 37 has a size not to seal between the insertion portion 37 and the inner hole 28 while the sealing member 31 is placed in a position in which the sealing plate 32 contacts with the outer surface of the lid member 19. The length of the insertion portion 37 in the axial direction is determined to allow the distal end of the insertion portion 37 to extend through the inner hole 28 but not to contact with the electrode body 12.

The movable portion 38 has a proximal end connected to the sealing plate 32 and is formed in a curved plate-like shape having a conical side surface. The movable portion 38 is formed protruding in a radial outward direction with a larger diameter so that a distal end is more away from the sealing plate 32. The outer diameter RE of the movable portion 38 is larger than the diameter RB of the inner open end 28a of the liquid inlet 25 and is smaller than the diameter RA of the outer open end 27a. The distance M between the distal end of the movable portion 38 in a natural state and the sealing plate 32 is larger than the depth H (see FIG. 4) of the outer hole 27 of the liquid inlet 25.

The sealing part 33 of the sealing member 31 is formed of an elastic body made of pure rubber material such as EPDM (ethylene propylene rubber), NBR (nitrile rubber), SBR (styrene-butadiene rubber), and others, mixed with carbon and a plasticizer. The sealing part 33 is made of a material selected from those having an appropriate hardness adjusted according to a mixture ratio of carbon. The appropriate range of hardness of the sealing part 33 is determined according to the type of the secondary battery 10, the magnitude of the inner pressure thereof, the performance of an inspection device mentioned later, and others.

Figure 6:
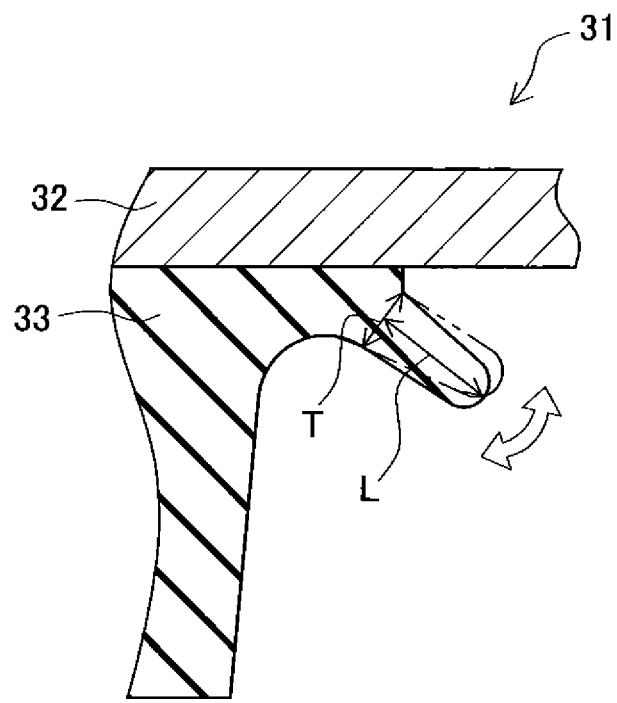
FIG. 6 is an enlarged explanatory view showing a part of FIG. 5.

FIG. 6 is an enlarged cross sectional view of the movable portion 38 in an axial direction of the sealing part 33. The axial direction of the sealing part 33 is a vertical direction to the sealing plate 32 and a penetrating direction of the liquid inlet 25 in a completed secondary battery 10 (see FIG. 3). The movable portion 38 having the aforementioned shape and material is flexible like for example an annular diaphragm within a certain range. The position of the distal end of the movable portion 38 is displaceable within a certain range as indicated by a hollow arrow in FIG. 6.

As shown in FIG. 6, the movable portion 38 has a cross sectional shape with a thickness T and a length L that are determined to meet a relationship of T<L. Specifically, the length of the movable portion 38 from the proximal end to the distal end in the protruding direction is longer than the thickness of the proximal end. Because of this shape, the movable portion 38 can be bent or curved outward about the proximal end as indicated by a chain double-dashed line in FIG. 6. The thickness T is a thickness of the proximal end (a starting point of warping) within a range of displacement when the movable portion 38 is bent as above. For instance, the minimum distance from the curvature center of the outer surface (a near side to the sealing plate 32) of the movable portion 38 in the cross sectional shape to the inner surface (a far side from the sealing plate 32) is the thickness T. The length L is a minimum distance between the distal end of the movable portion 38 and a line defining the thickness T.

Figure 7:
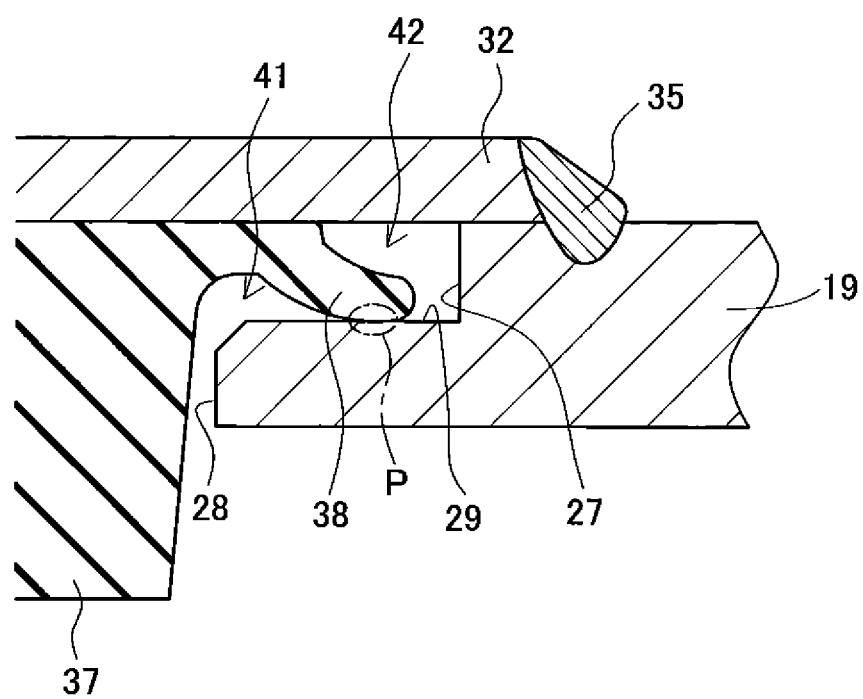
FIG. 7 is an enlarged cross sectional view of a movable portion in a contact position.

While the sealing member 31 is attached to the lid member 19, the movable portion 38 is slightly deformed as shown in FIG. 7 from the natural state. Specifically, when the 38 is attached to the liquid inlet 25, part of the movable portion 38 is pressed against the bottom surface 29 of the liquid inlet 25, pushing up the distal end of the movable portion 38 toward the sealing plate 32 more than the original state. A contact portion P between the movable portion 38 and the bottom surface 29 has an annular shape surrounding the entire circumference of the inner hole 28 of the liquid inlet 25 along the bottom surface 29. Accordingly, the contact portion P seals the liquid inlet 25. This placement is referred to as a contact position of the movable portion 38. In FIG. 7, the contact portion P is enclosed by a dashed line.

When the movable portion 38 is placed in the contact position, providing sealing at the contact portion P, the inside region 41 and the outside region 42 are not communicated with each other. The inside region 41 is a region located closer to the inside of the battery housing 11 than the movable portion 38 in the outer hole 27. Since the insertion portion 37 does not seal the inner hole 28 as mentioned above, the inside region 41 is communicated with the inside of the secondary battery 10, that is, a region in which the electrode body 12 and the electrolyte 13 are placed. On the other hand, the outside region 42 is a region located closer to the outside than the movable portion 38 in the outer hole 27 and surrounded by the sealing plate 32 and the movable portion 38. When a welding state of the weld zone 35 is good, the outside region 42 is a sealed region.

Figure 8:
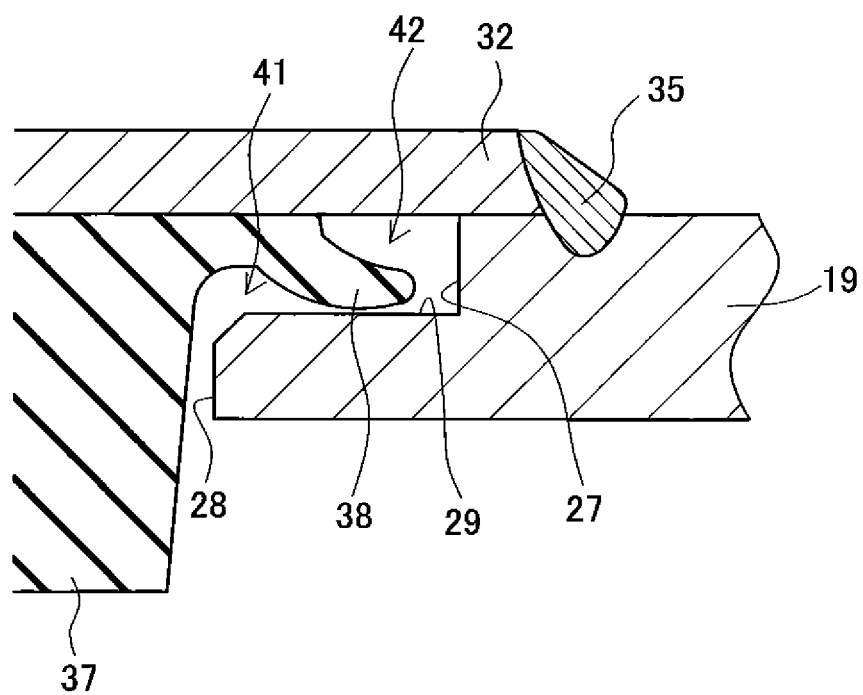
FIG. 8 is an enlarged cross sectional view of the movable portion in a non-contact position.

The movable portion 38 can be further displaced from this contact portion. That is, when the pressure in the inside region 41 is higher than the pressure in the outside region 42, and, when a difference in pressure between both regions exceeds a limit value, at least part of the movable portion 38 is displaced from the inside region 41 side to the outside region 42 side as shown in FIG. 8. This displacement brings the movable portion 38 out of contact with the bottom surface 29 at that portion, thereby allowing communication between the inside region 41 and the outside region 42 located on both sides of the movable portion 38 through a displacement area. This placement is referred to as a non-contact position of the movable portion 38. In the present embodiment, since the movable portion 38 is made of rubber material, when the pressure difference becomes the limit value or less, the movable portion 38 returns to the contact position by elasticity.

The secondary battery 10 of the present embodiment includes the movable portion 38 freely displaceable between the contact position and the non-contact position. When the movable portion 38 is in the contact position, the inside of the secondary battery 10 is sealed by the contact portion P. On the other hand, when the movable portion 38 is in the non-contact position, the inside of the secondary battery 10 is not sealed by at least the movable portion 38. To enable displacement of the movable portion 38 as above, the secondary battery 10 of the present embodiment is provided with a clearance between the distal end of the movable portion 38 and the sealing plate 32 so as not to interfere with displacement of the distal end of the movable portion 38. For instance, the depth H of the outer hole 27 (see FIG. 4) is larger than the thickness T of the movable portion 38.

[Method for Manufacturing the Battery]

Next, a process for manufacturing the secondary battery 10 will be briefly explained. In this process, a lid sub-assembly is produced in advance by integrally connecting the electrode body 12, the positive terminal 15, the negative terminal 16, and the lid member 19. Thereafter, the electrode body 12 of this lid sub-assembly is inserted in the battery case 18 and then the battery case 18 and the lid member 19 of the lid sub-assembly are welded to each other. The battery housing 11 is thus assembled.

The assembled battery housing 11 is put in a chamber or the like and depressurized to reduce the internal pressure of the housing 11. Under reduced pressure of the housing 11, the electrolyte 13 is poured therein through the liquid inlet 25. Furthermore, the sealing member 31 is then attached to the liquid inlet 25 while the housing 11 remains depressurized.

The battery housing 11 supplied with the electrolyte 13 is taken out into the atmosphere. Since the housing 11 is sealed with the sealing part 33 of the sealing member 31 attached thereto under the reduced pressure, even if the housing 11 is taken out into the atmosphere, water or foreign matters are less likely to enter in the battery housing 11. Thereafter, the sealing plate 32 of the sealing member 31 is welded to the lid member 19 over the entire circumference thereof under atmospheric pressure, thereby forming the weld zone 35. Accordingly, immediately after welding, the liquid inlet 25 is sealed with the sealing part 33 and the weld zone 35, i.e., by a double seal structure. The assembled secondary battery 10 is subjected to an initial charge step and an aging step. The secondary battery 10 is thus completed. In the initial charge step, gas such as hydrogen gas is generated in the secondary battery 10.

[Welding Inspection]

Figure 9:
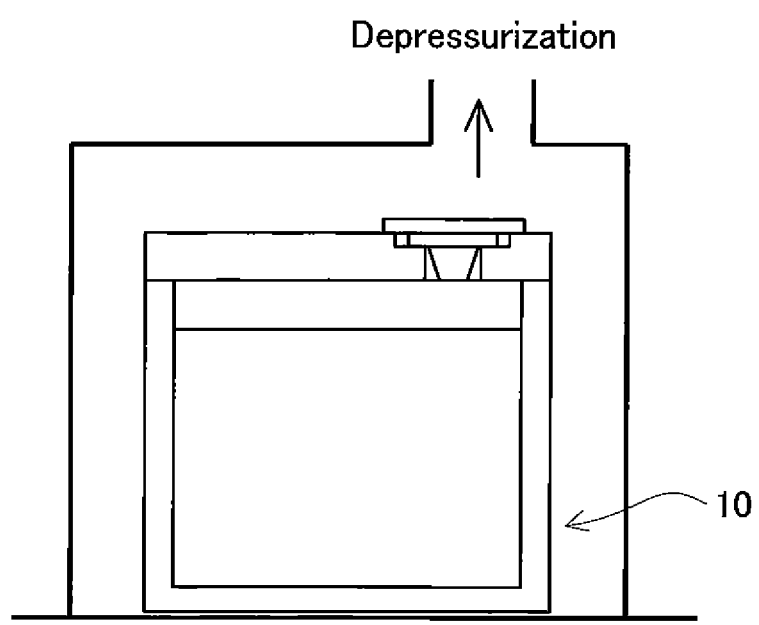
FIG. 9 is an explanatory view showing an inspection step.

Next, an explanation is given to a welding inspection step of determining the quality (good/defective) of a welding state of the completed secondary battery 10. In this welding inspection step, as shown in FIG. 9, the secondary battery 10 is entirely put in the chamber again and the pressure outside of the secondary battery 10 is reduced. Alternatively, only a part surrounding the liquid inlet 25 may be sealed and depressurized. A flowmeter is placed in a discharge passage of the chamber to detect, outside the secondary battery 10, gas such as hydrogen gas, organic gas, and so on, generated in the secondary battery 10.

A secondary battery 10 having the weld zone 35 in a good welding state is reliably sealed with the weld zone 35. Thus, even when the outside of the secondary battery 10 is depressurized, no gas leaks out of the secondary battery 10. Accordingly, no gas is detected in the welding inspection. Specifically, the secondary battery 10 from which no gas is detected in the welding inspection is determined to be good in the welding state.

Figure 10:
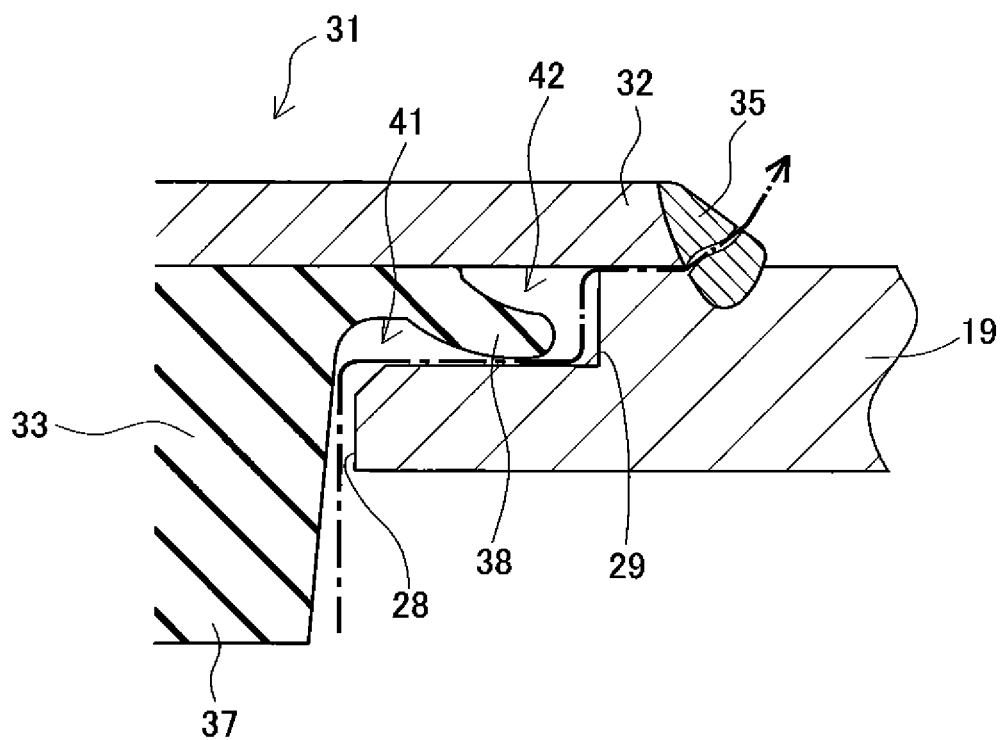
FIG. 10 is an enlarged cross sectional view of a movable portion of a defective sealing member.

On the other hand, a secondary battery 10 with the weld zone 35 in an insufficient welding state may cause for example cracks as shown in FIG. 10. Because of this state, when the pressure outside of the secondary battery 10 is reduced, the outside region 42 on the inside of the sealing plate 32 is also reduced in pressure. That is, in the secondary battery 10 having a welding defect, the outside region 42 is also reduced in pressure in the welding inspection.

In the secondary battery 10, as described above, the outside region 42 and the inside region 41 are partitioned by the contact portion P of the movable portion 38 (see FIG. 7). This movable portion 38 is displaceable as mentioned above. Specifically, when the outside region 42 is depressurized and the pressure in the outside region 42 decreases beyond the limit value than the pressure in the inside region 41, the movable portion 38 is displaced to the non-contact position as shown in FIG. 10.

In this non-contact position, at least part of the contact portion P is in a non-contact state, allowing communication between the inside region 41 and the outside region 42 on both sides of the movable portion 38. In other words, when the movable portion 38 is in the non-contact position, the sealing property of the movable portion 38 is lost. Meanwhile, the insertion portion 37 has a smaller diameter than the inner hole 28 of the liquid inlet 25 and further no sealing is provided between the insertion portion 37 and the liquid inlet 25. That is, the inside of the secondary battery 10 and the inside region 41 are placed in communication with each other.

Accordingly, the gas generated inside the secondary battery 10 is caused by the pressure difference between inside and outside to pass through the inner hole 28, the inside region 41, and the outside region 42 and then leak out of the sealing plate 32 through crack(s) as indicated by an arrowhead dashed line in FIG. 10. Specifically, in the welding inspection, when the gas is detected outside a secondary battery 10, this secondary battery 10 is determined to be defective in the welding state.

Specifically, in the welding inspection step of the secondary battery 10, in case the welding state is poor or defective, the sealing property of the movable portion 38 is lost. Accordingly, gas will surely leak if a welding defect is present and, therefore, it is possible to avoid a situation where gas leakage cannot be detected even though the welding defect has occurred. In the welding inspection step performed as above, the hermetically sealing property of the weld zone 35 can be appropriately examined and welding defects such as cracks can be reliably detected.

The sealed state by welding can be maintained for a long term. As long as it is possible to confirm at the time of welding inspection that sealing is appropriately obtained, it is expected that the sealed state can be kept throughout at least a usable term of the secondary battery 10.

In the secondary battery 10 of the present embodiment, as described above, since the sealing part 33 is made of rubber material having elasticity, the movable portion 38 has a returning function. That is, even when the movable portion 38 is deformed to the non-contact position once in the welding inspection, the movable portion 38 will return to the contact position when the pressure difference decreases below the limit value. In other words, even when gas is detected in the welding inspection, the gas and the electrolyte will not leak out after the welding inspection is stopped and the secondary battery 10 is taken out into the atmosphere. Further, external water or foreign matters are less likely to enter in the secondary battery 10.

[Performance Evaluation]

Next, the material and the shape of the sealing part 33 will be explained. The present inventors produced sealing members as Example 1 and Comparative examples 1 to 4 so that respective sealing parts 33 are different in shape and hardness, attached those sealing members at different compression ratios, and then measured respective breakage pressures.

A breakage pressure measurement test is conducted as below by use of a leak detector (HELIOT710 by ULVAC). Firstly, a test plate 51 made of the same material as that of the lid member 19 is formed with a test hole 52 having the same shape as the liquid inlet 25. The sealing member 31 is attached to this test plate 51. Instead of welding of the entire circumference of the sealing plate 32, the sealing plate 32 is attached to the test plate 51 by four-point welding. Thus, complete sealing is not provided between the sealing plate 32 and the test plate 51.

Figure 11:
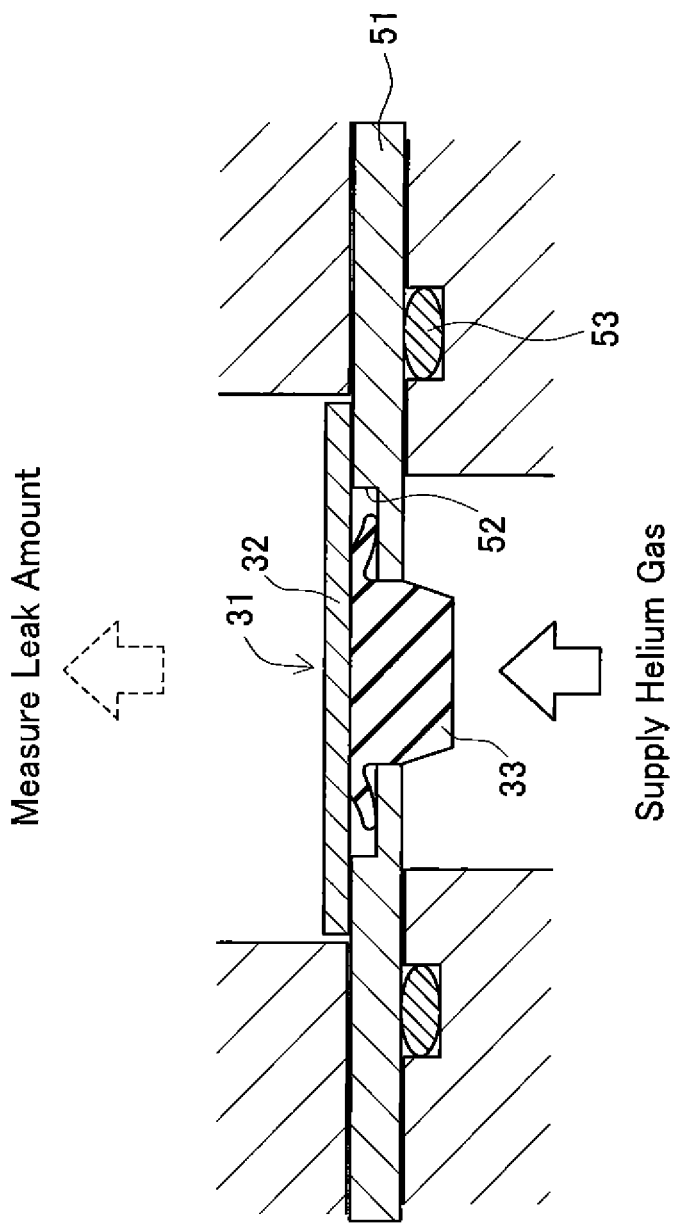
FIG. 11 is an explanatory view showing a breakage pressure measurement test.

Secondly, as shown in FIG. 11, the test plate 51 is clamped by jigs over its entire circumference of the test hole 52 through an O ring 53. This prevents release of pressure from other portions than the test hole 52. In this state, helium gas is supplied from a side of the sealing part 33 of the sealing member 31 (from the lower side in the figure) and then the helium gas is detected on a side of the sealing plate 32 of the sealing member 31 (on the upper side in the figure). By increasing the pressure of helium gas to be supplied, a pressure difference between both sides of the test plate 51 is measured when the helium gas leakage on the upper side is detected. Hereinafter, the pressure difference measured at the time when the leakage occurs is referred to as breakage pressure.

Based on the depth H (see FIG. 4) of the outer hole 27 of the liquid inlet 25 in the lid member 19 and the distance M (see FIG. 5) between the distal end of the movable portion 38 and the sealing plate 32 in the sealing member 31 before attached to the lid member 19, a compression ratio S is defined as below.

Compression ratio $S=(1-(H/M))\times 100$ (%)

The sealing part 33 of the sealing member 31 is preferably designed so that the breakage pressure falls within 60 to 100 kPa for the compression ratio S in a range of on the order of 5 to 35%.

The sealing member 31 of Example 1 is provided with the sealing part 33 made of rubber material with a Shore hardness of Hs50 and the movable portion 38 having a shape defined by a relationship of (Length L/Thickness T)=1.75. This sealing member 31 is attached to each of the test plates 51 having the outer holes 27 different in depth H. At different compression ratios S as in Table 1, respective break pressures were measured.

All the sealing members 31 of Comparative examples 1 to 4 are provided with the movable portions 38 each having a shape defined by a relationship of (Length L/Thickness T)=1.0. Furthermore, as shown in Table 1, the sealing members 31 having the sealing parts 33 made of materials different in Shore hardness are produced as Comparative examples. The material in Comparative example 1 is the same as that in Example 1. Accordingly, the Shore hardness in Comparative example 1 is Hs50. The materials selected in other Comparative examples 2 to 4 are higher in hardness than that in Example 1. Further, the sealing members 31 are attached at different compression ratios and respective breakage pressures were measured.

TABLE 1

|  | Shore Hardness | Compression ratio (%) | Breakage Pressure (kPa) |
| --- | --- | --- | --- |
| Example 1 | Hs50 | 9.5 | 60 |
|  |  | 22.2 | 80 |
|  |  | 33.3 | 100 |
| Comparative example 1 | Hs50 | 19.0 | 0 |
|  |  | 32.0 | 100 |
| Comparative example 2 | Hs55 | 5.0 | 0 |
|  |  | 19.0 | 50 |
|  |  | 32.0 | 150 |
| Comparative example 3 | Hs60 | 19.0 | 100 |
| Comparative example 4 | Hs70 | 19.0 | 100 |

Results of this experiment are shown in Table 1. In Example 1, the breakage pressure is in a range of 60 to 100 kPa for the compression ratio S in a range of 9.5 to 33.3%. Specifically, even when the compression ratio S is changed in this range, the breakage pressure results in a value in an appropriate range. The breakage pressure measured in this experiment corresponds to the aforementioned limit value of the secondary battery 10. It is thus confirmed that, according to the sealing member 31 of Example 1, the aforementioned limit value could be adjusted to a preferable value by appropriate selection of the compression ratio S suitable for the depth H of the outer hole 27. It is also confirmed that even if the compression ratios S are slightly different, the limit value could be adjusted to an appropriate range.

In contrast, the shapes in Comparative examples 1 to 4 could not obtain appropriate breakage pressures even by adjustment of hardness. In Comparative example 1, the breakage pressure is 0 kPa at a compression ratio S of 19%. Leakage has already occurred even before the pressure is increased. In Comparative example 2, the breakage pressure is 50 kPa at a compression ratio S of 19%. This breakage pressure is too small. That is, when the sealing part 33 having the movable portion 38 designed with the thickness T equal to the length L is made of a material with a hardness of Hs50 to 55, the breakage pressure is too small.

In Comparative examples 3 and 4, the breakage pressure is 100 kPa at a compression ratio S of 19%. This breakage pressure is already an upper limit even though the compression ratio S is not so large. If the sealing members 31 in Comparative examples 3 and 4 are attached at larger compression ratios, the breakage pressure becomes larger, obviously resulting in a value exceeding the upper limit. When the sealing part 33 having the movable portion 38 shaped with the thickness T equal to the length L is made of a material with a hardness of Hs 60 to 70, the breakage pressure is too large. The above results reveal that when the shape of the movable portion 38 is designed with the thickness T equal to the length L as in Comparative examples 1 to 4, an appropriate breakage pressure could not be obtained by every hardness of the material selected for forming the sealing part 33.

From the above experimental results, it is confirmed that the shape meeting a relationship of thickness T<length L as in Example 1 could provide the sealing member 31 with a limit value falling within an appropriate range at the compression ratio S in an allowable entire range. In a case of manufacturing a sealing member 31 with a higher breakage pressure than those in the above experiment, the sealing part 33 may be made of rubber materials larger in hardness.

According to the secondary battery 10 of the present embodiment, as explained in detail above, the sealing member 31 for sealing the liquid inlet 25 is formed of the sealing part 33 having the movable portion 38 and the sealing plate 32 fixed thereto. Just after the sealing member 31 is attached to the liquid inlet 25, the movable portion 38 is in contact with the entire circumference of the liquid inlet 25. The liquid inlet 25 is thus sealed by the movable portion 38. This prevents water and others from entering in the battery 10 even in a welding work in the atmosphere. Furthermore, the sealing plate 32 is welded over its circumference to the lid member 19 and sealed with the weld zone 35. This constitutes a double seal structure using the sealing part 33 and the weld zone 35.

The secondary battery 10 having been completely assembled is subjected to the initial charge step and then the welding inspection. In the welding inspection step, the outside of the secondary battery 10 is depressurized. If a welding defect exists in the secondary battery 10, the outside region 42 is also depressurized, causing the movable portion 38 to be displaced to the non-contact position due to the pressure difference. Accordingly, it is possible to easily determine the welding defect based on whether or not for example the gas generated in the secondary battery 10 in the initial charge step is detected outside the secondary battery 10. Consequently, the secondary battery 10 can be configured to reliably enable the quality of the welding state of a surrounding part of the liquid inlet without being influenced by the sealing property of the sealing part 33.

The above embodiment is a mere example and does not limit the present invention. Thus, the present invention may be embodied in other specific forms without departing from the essential characteristics thereof For instance, the present invention is not limited to the lithium ion secondary battery and is also applicable to a sealed secondary battery such as nickel hydride secondary battery and a nickel cadmium secondary battery. The invention is not limited to the rectangular secondary battery of the above embodiment and may be applied to a cylindrical or button-shaped secondary battery.

Figure 12:
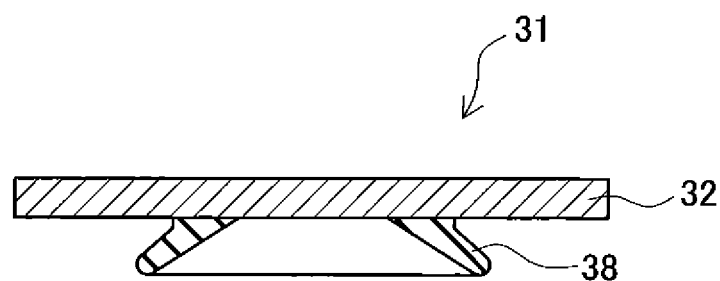
FIG. 12 is an explanatory view of a sealing member in another example.

Furthermore, for example, the sealing member 31 may be formed without an insertion portion as shown in FIG. 12. To be concrete, this sealing member 31 may be configured such that the sealing part 33 consists of only a movable portion 38, and the sealing plate 32 and the movable portion 38 are directly fixed to each other. Even the secondary battery 10 using such a sealing member 31 enables reliable determination on the quality of the welding state by depressurization of the outside of the battery 10.

Moreover, the sealing plate 32 may be formed with a smaller diameter than the outer open end 27a of the liquid inlet 25. However, the sealing plate 32 is preferred to have a size fittable in the outer hole 27 to seal by welding between the outer periphery of the sealing plate 32 and the inner wall of the outer hole 27. In this case, it is preferable that the sealing plate 32 is internally formed with a space or cavity in which the movable portion 38 is placed.

In the above embodiment, for example, since the sealing part 33 is an elastic body, the movable portion 38 has a returning function. However, the movable portion 38 does not necessarily have to return. As long as a secondary battery determined to be defective in the welding inspection can be appropriately addressed, a movable portion 38 configured not to return may be adopted. For example, the movable portion 38 may be made of resin formed with a weak or fragile portion.

In the above embodiment, for example, the liquid inlet 25 is a stepped hole having the outer hole 27 and the inner hole 28, so that the movable portion 38 of the sealing member 31 is in pressure contact with the bottom surface 29 of the outer hole 27. However, the invention is not limited thereto and may adopt a sealing member formed with a non-stepped through hole and a movable portion is in pressure contact with the inner wall of the through hole over the entire circumference.

In the above embodiment, for example, the gas leakage is detected in the welding inspection. As an alternative, the welding state can be determined based on a change in outer shape of the secondary battery 10. In a secondary battery having defective welding, the battery inside is also depressurized in the welding inspection, thereby making the outer shape of the battery thinner than a secondary battery having good welding. In other words, the quality of the welding state can be determined based on the shape of the secondary battery subjected to depressurization.

REFERENCE SIGNS LIST

10 Secondary battery
11 Battery housing
12 Electrode body
13 Electrolyte
25 Liquid inlet
27 Outer hole
28 Inner hole
31 Sealing member
32 Sealing plate
33 Sealing part
35 Weld
37 Insertion portion
38 Movable portion

The invention claimed is:

1. A sealed battery including:
an electrode body;
a battery case housing the electrode body and having an open surface;
a lid member closing the open surface of the battery case;
a liquid inlet formed penetrating through the lid member; and
a sealing member configured to seal the liquid inlet, wherein
the sealing member includes:
a metal sealing plate welded to the lid member around the liquid inlet to cover an outer open end of the liquid inlet to seal the liquid inlet; and
an annular movable portion placed in contact with a surface of the sealing plate on an inside of the battery case and provided freely displaceable between a contact position where the movable portion contacts with an entire circumference of the liquid inlet and a non-contact position where the movable portion does not contact with at least part of the liquid inlet, the movable portion being configured to seal the liquid inlet when the movable portion is in the contact position,
the movable portion is configured to be displaced to the non-contact position when pressure in an inside region on inside of the battery case sealed by the movable portion in the contact position is increased beyond a limit value with respect to pressure in an outside region on an opposite side to the inside region with respect to the movable portion, and
the inside region is a region in the battery case that is more inside than the movable portion, and the outside region is a region on an opposite side to the inside region with respect to the movable portion.

2. The sealed battery according to claim 1, wherein the movable portion has a returning function of returning from the non-contact position to the contact position when a pressure difference between the inside region and the outside region returns to the limit value or less after the movable portion is displaced to the non-contact position.

3. The sealed battery according to claim 2, wherein the movable portion is an elastic body.

4. The sealed battery according to claim 1, wherein the movable portion is made of rubber material.

5. The sealed battery according to claim 1, wherein the movable portion has a cross sectional shape in a penetrating direction of the liquid inlet to have a thickness T and a length L determined to meet a relationship of T<L.

6. The sealed battery according to claim 1, wherein the sealing member includes an insertion portion located inside the movable portion of an annular shape and inserted in the liquid inlet in contact with a surface of the sealing plate on the inside of the battery case.

7. The sealed battery according to claim 1, wherein
the liquid inlet includes:
a bottom-closed outer hole including an outer open end; and
an inner hole including an inner open end and being coaxial with the outer hole, the inner hole having a smaller diameter than the outer open end,
the inner hole is formed penetrating through the lid member to communicate with the outer hole through a bottom surface of the outer hole, and
the movable portion is configured to protrude obliquely from a surface of the sealing plate on the inside of the battery case outward in a radial direction of the liquid inlet and placed in pressure contact with the bottom surface of the outer hole to seal the liquid inlet.

* * * * *